Feb. 16, 1971  R. W. NOLAN  3,564,569

METHOD OF MAKING VOLTAGE REGULATORS

Filed Jan. 4, 1968  2 Sheets-Sheet 2

INVENTOR
ROGER WILLIAM NOLAN

United States Patent Office 3,564,569
Patented Feb. 16, 1971

3,564,569
METHOD OF MAKING VOLTAGE REGULATORS
Roger William Nolan, Redditch, England, assignor to Joseph Lucas (Industries) Limited, Birmingham, England
Filed Jan. 4, 1968, Ser. No. 695,787
Claims priority, application Great Britain, Jan. 16, 1967, 2,185/67
Int. Cl. G01r; G05f; H01b
U.S. Cl. 29—593   4 Claims

ABSTRACT OF THE DISCLOSURE

A voltage regulator for a battery charging system on a road vehicle is manufactured by mounting the active components of the regulator on a thick film printed circuit including a setting resistor exposed on one edge of the substrate of the printed circuit. Any remaining connections are then made, and if the regulator is satisfactory the resistor exposed on the edge of the substrate is abraded to set the oscillating voltage of the regulator, the regulator then being mounted on a heat sink and encapsulated. As an essential feature, the regulator is tested before the abrading operation, so that if it is faulty the thick film circuit can be used again by removing the active components from it.

---

This invention relates to the manufacture of voltage regulators for use in battery charging systems on road vehicles.

The invention resides in a method of manufacturing a voltage regulator, comprising the following steps in the following order:

(a) mounting the active components of the regulator on a thick film printed circuit which includes a setting resistor;
(b) making any further connections necessary to complete the regulator, and testing the regulator;
(c) assuming that the regulator is not faulty, abrading the setting resistor so that the regulator operates at the required voltage;
(d) securing the regulator to a heat sink; and
(e) encapsulating the regulator.

It is most important that the regulator should be tested at stage (b). The thick film circuit constitutes the major part of the cost of the regulator, and if the regulator is faulty, it is a simple matter to remove the active components and use the thick film circuit again.

In the accompanying drawings.

Figure 1:
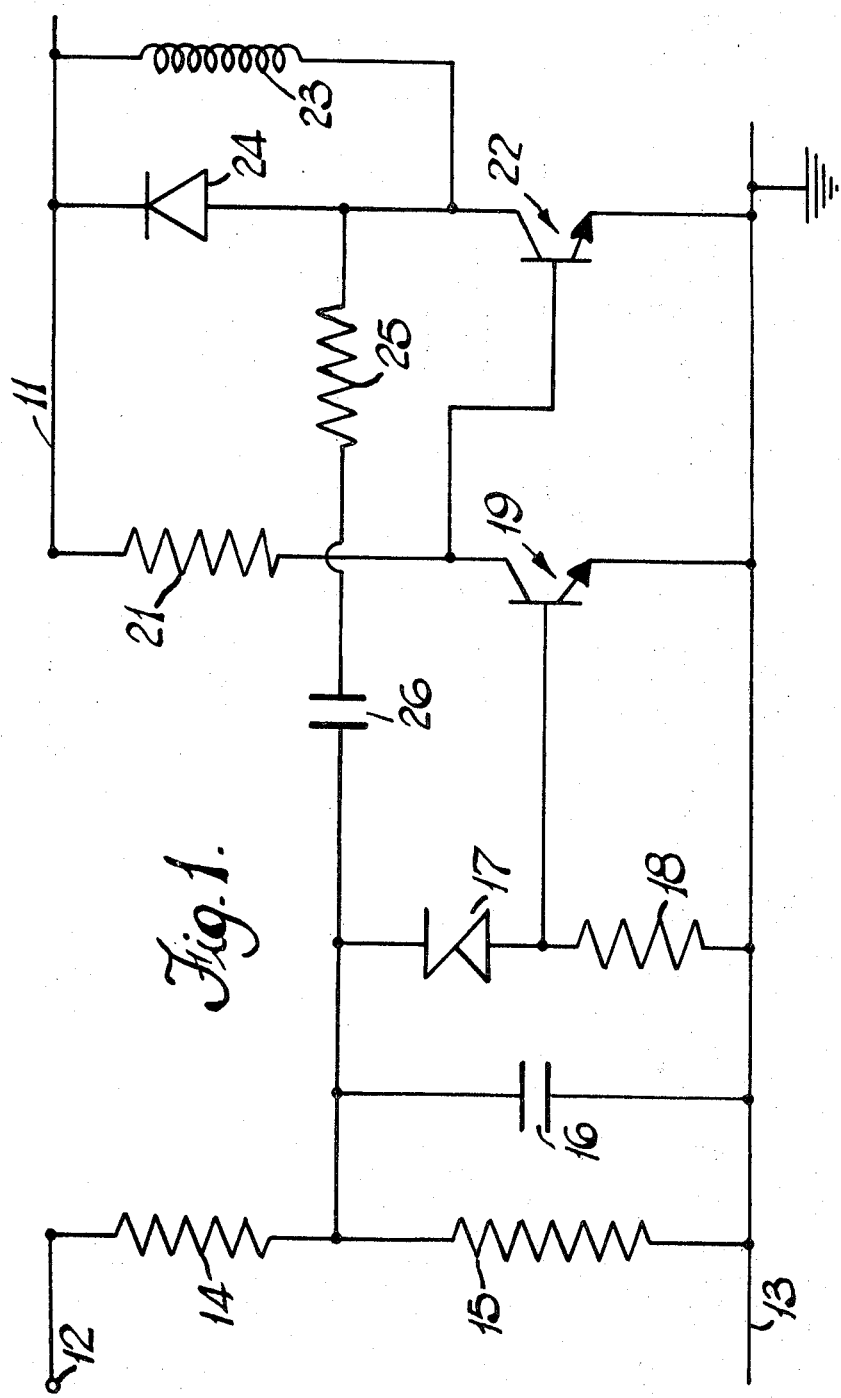
FIG. 1 is a circuit diagram illustrating one example of a voltage regulator which can be manufactured in accordance with the invention.

Referring first to FIG. 1, the regulator shown is designed for use with an alternator on a road vehicle, the alternator serving through a full wave rectifier to provide power to a battery having a positive terminal 12 and a negative terminal connected to an earthed supply line 13, the alternator also supplying power through one or more auxiliary diodes to a positive supply line 11. Connected between the terminal 12 and the line 13 are a pair of resistors 14, 15 in series, a point intermediate these resistors being connected to the line 13 through a capacitor 16, and being further connected to the cathode of a Zener diode 17, the anode of which is connected to the line 13 through a resistor 18 and is further connected to the base of an n-p-n transistor 19. The transistor 19 has its emitter connected to the line 13, and its collector connected to the line 11 through a resistor 21, a further connection from the collector of the transistor 19 being made to the base of a second n-p-n transistor 22. The transistor 22 has its emitter connected to the line 13, and its collector connected to the line 11 through the field winding 23 of the alternator. The winding 23 is bridged by a diode 24, and the collector of the transistor 22 is also connected through a resistor 25 and a capacitor 26 in series to the cathode of the diode 17.

In operation, when the battery voltage is below a predetermined value, the Zener diode 17 is non-conductive, and so no base current flows through the transistor 19. Current flowing through the resistor 21 turns the transistor 22 on, and current flows in the field winding 23. When the predetermined voltage is reached, the Zener diode 17 conducts to provide base current to the transistor 19, which removes the base current from the transistor 22. By virtue of the feedback connection through resistor 25 and capacitor 26, the circuit oscillates between one state with the transistor 19 fully conductive and the transistor 22 off, and a second state with the transistor 22 fully conductive and the transistor 19 off, the mark-space ratio being determined by the current flowing through the Zener diode 17, which in turn is determined by the battery voltage. The arrangement is such that the mean current flow in the winding 23 maintains the battery voltage substantially constant.

In manufacturing such a regulator, a thick film printed circuit in the form of a board 32 is used on which is printed all the resistors shown in FIG. 1, together with most of the connections between the various components. The active components, namely components 17, 19, 22, 24, are mounted on conductive portions of the board 32, these components being omitted from FIGS. 2 and 3 for clarity. The capacitors 16 and 26 are mounted in a similar manner. Additional connections are made when the active components have been mounted on the board 32, such additional connections being necessary because only one electrode of any of the active devices can be electrically connected to the board. For example, the transistors 19, 22 are mounted on the board 32 with their collectors electrically connected to the contact area provided on the board. It is then necessary to make further connections from the emitter and base of the transistor 19 and of the transistor 22 to the appropriate conductive areas on the board, and similar considerations apply to one of the electrodes of the diode 24 and the Zener diode 17.

The board 32 itself can be of any convenient form, and could, for example, have an alumina substrate. It is preferable that the resistor 14, which acts as a setting resistor, should extend along one edge of the board.

Figure 2:
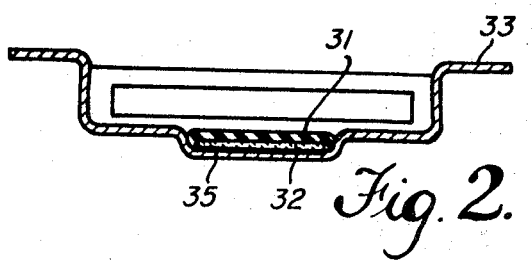
FIG. 2 is a sectional side view showing a heat sink with a voltage regulator mounted therein.
Figure 3:
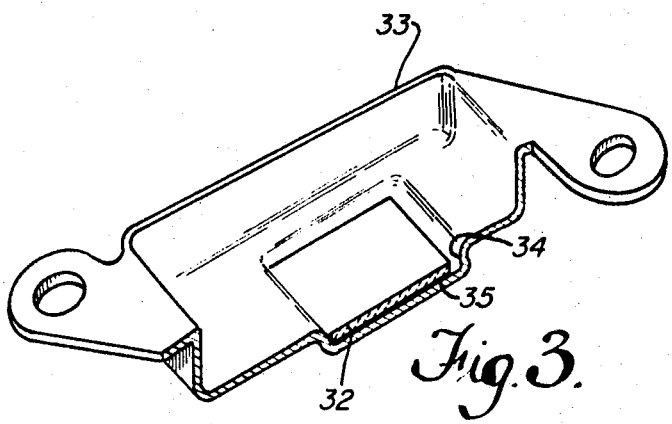
FIG. 3 is a perspective view illustrating one stage during the manufacture of the regulator.

After the active components have been mounted on the board 32 and the further connections made, the regulator is tested. Assuming that the regulator is operating satisfactorily, it is then set to the required voltage by abrading the setting resistor 14, which alters the value of the resistor 14. The regulator is then secured to a heat sink, as shown in FIGS. 2 and 3. The heat sink 33 is formed with a recess 34 shaped to accommodate the board 32, which is placed in position with the active components on the upper surface of the board 32 as shown in FIG. 3, the lower surface of the board being secured to the heat sink 33 by an adhesive 35 which preferably is in the form of silicone rubber loaded with aluminium, the purpose of the aluminium being to provide a heat-conductive path between the board 32 and the heat sink 33. External connections (not shown) must of course be made to the regulator. Finally, the regulator is encapsulated in silicone rubber 31 as shown in FIG. 2.

Having thus described my invention what I claim as new and desire to secure by Letters Patent is:

1. A method of manufacturing a voltage regulator for use in a battery charging system on a road vehicle, comprising the following steps in the following order:
   (a) mounting the active components of the regulator on a thick film printed circuit which includes a setting resistor;
   (b) making any further connections necessary to complete the regulator, and testing the regulator;
   (c) assuming that the regulator is not faulty, abrading the setting resistor so that the regulator operates at the required voltage;
   (d) securing the regulator to a heat sink; and
   (e) encapsulating the regulator.

2. A method as claimed in claim 1 wherein the regulator is secured to the heat sink with a heat conductive adhesive.

3. A method as claimed in claim 2 wherein said adhesive is silicone rubber loaded with aluminium.

4. A method as claimed in claim 1 wherein the regulator is secured in commensurately shaped recess in the heat sink and the encapsulating is with silicone rubber.

References Cited

UNITED STATES PATENTS

| 2,850,681 | 9/1958 | Horton. | |
| 3,071,749 | 1/1963 | Starr. | |
| 3,228,091 | 1/1966 | Rice et al. | 29—626 |
| 3,427,510 | 2/1969 | Schwarz et al. | 29—592X |

FOREIGN PATENTS

| 581,474 | 8/1959 | Canada. |
| 973,116 | 10/1964 | Great Britain. |

JOHN F. CAMPBELL, Primary Examiner

V. A. DI PALMA, Assistant Examiner

U.S. Cl. X.R.

29—627